No. 849,094. PATENTED APR. 2, 1907.
O. F. ZAHN.
SELF RIGHTING ROLLER BEARING.
APPLICATION FILED SEPT. 5, 1906.
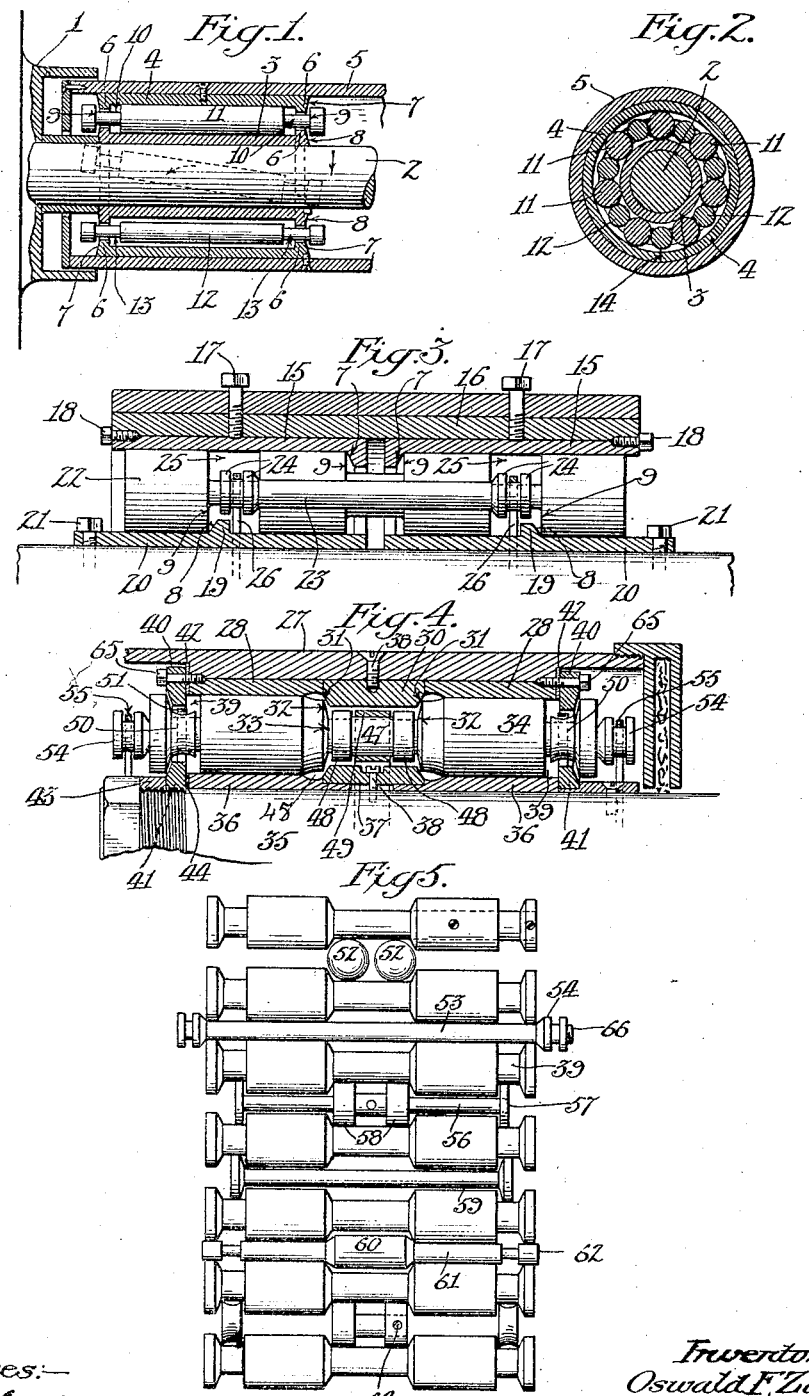

UNITED STATES PATENT OFFICE.

OSWALD F. ZAHN, OF LOS ANGELES, CALIFORNIA.

SELF-RIGHTING ROLLER-BEARING.

No. 849,094.

Specification of Letters Patent.

Patented April 2, 1907.

Application filed September 5, 1906. Serial No. 335,017.

*To all whom it may concern:*

Be it known that I, OSWALD F. ZAHN, a citizen of the United States, residing at Los Angeles, in the county of Los Angeles, State of California, have invented a new and useful Self-Righting Roller-Bearing, of which the following is a specification.

The main object of this invention is to provide a roller-bearing wherein the rollers will continually tend to right themselves or maintain their parallelism with the axis of the bearing. In roller-bearings there is usually a tendency of the roller to swerve or deflect from straight position, thereby causing cramping or binding of the rollers in the bearing. It has been attempted to remedy this by the use of tracks, constraining the rollers to the proper path. Such bearings work well on light pressures; but when the pressure is heavy the friction between the bearings and rollers in case of deflection is so great that the tendency of the rollers to swerve overcomes the guiding effect of the tracks, the rollers then cramping in the bearing. My invention avoids this difficulty by providing the rollers and both bearing members with means which on deflection of the rollers engage in such manner that the friction that is brought into play itself tends to right the rollers, and the righting effect is in proportion to the friction and to the pressure, and is therefore always sufficient to rectify the rollers.

Another object of the invention is to provide a roller-bearing wherein the same rollers serve to take all the strains that may be brought on the bearing, the rollers that support the bearing members against side, top, or bottom pressure also serving to take the end thrust.

Another object of the invention is to provide a roller-bearing with means for producing in itself a sidewise drift that will overcome or counteract a lateral pressure on the bearing.

In the accompanying drawings, Figure 1 is a longitudinal section of an automobile driving-axle bearing embodying the invention. Fig. 2 is a transverse section thereof. Figs. 3 and 4 are partial longitudinal sections of other forms of the invention. Fig. 5 is a somewhat diagrammatic view of the rollers used in the form shown in Fig. 4, showing different forms of the spacing-rollers.

Referring to Figs. 1 and 2, wherein the bearing is shown in a form especially applicable to automobile driving-axles, the wheel-hub 1 is fastened on the axle 2, to which is secured an inner bearing member 3. An outer bearing member 4 is secured to a tubular supporting member 5, which is supported by the vehicle running-gear. The outer and inner bearing members or sleeves 4 5 have end flanges 6 to provide annular abutments 7 8 for engaging shoulders 9 at the outer ends of grooves 10 in the bearing-rollers 11. Said outer bearing member is split, as at 14. Spacing-rollers 12 are provided, alternating with the bearing-rollers and of smaller diameter than the bearing-rollers, said spacing-rollers also having grooves 13, into which extend the flanges or abutments 7 8, aforesaid, to limit the longitudinal movement of the spacing-rollers. The outer faces of said flanges or abutments—that is to say, those faces thereof which are farthest from the mid-length of the bearing-roller—engage with the inwardly-facing shoulders or walls of the grooves 10 in the bearing-rollers, and the inner faces of said flanges or abutments are free from engagement with the rollers. This effect is produced by making the clearance between the shoulders of the grooves and the faces of the abutments less on the outer sides of the flanges or abutments than it is on the inner sides thereof, so that if engagement occurs it will necessarily be on the outer sides solely, and will thereby tend to automatically right the rollers in the bearing, as hereinbefore set forth. To explain this action, let it be assumed that the inner bearing member is turning in the direction of the arrow, the rollers thereof revolving in the same direction, at a slower rate, and the outer member being fixed. If a roller deflects or skews to a position such as indicated by dotted lines, with one end—say the right-hand end—in advance of the other, it will in its further movement swerve or drift away from that end, or toward the left, as indicated by the dotted arrow, thereby bringing the shoulder at the advanced end against the right-hand annular abutment 7 on the outer bearing member, the position of which is indicated in dotted lines. The contact or engagement thus developed at the advanced end of the roller will retard the advanced end of the roller until it is restored to correct position. It will also be noted that the inner bearing member in rolling over the skewed roller will tend to drift to the same end as the roller, but at a greater speed, so that its annular abutment toward the left hand or retarded end of the roller will bear toward and against the shoulder of the roller and by the consequent forward drag thereon will also tend to right the roller in the bearing, and there are no longitudinal engagements tending to derectify. This rectifying effect would therefore be produced by annular abutments on either the outer or the inner member, and my invention is not limited to their use on both members; but such use is of advantage in balancing and cumulating the rectifying effect and as a further function of greater importance in taking end thrust, thereby dispensing with the use of the usual end-thrust devices, such as ball-bearing rings. Longitudinal pressure of the outer bearing member relatively to the inner bearing member will bring the annular abutment of the outer bearing member against the shoulders of the rollers, and the shoulders at the other ends of the rollers will be brought against the annular abutment at that end of the inner member, thus transmitting the pressure from one bearing member to the other through the rollers. The same rollers, therefore, take the radial, top, bottom, or side pressure and the end pressure. It will be noted that where these shoulders and abutments touch each other there will be friction, except just at the line or point where the diameter is equal to that of the rolling surfaces—that is to say, where the shoulder-face and the abutment-face meet the rolling face of the rollers. One or both of these faces are therefore desirably cut away or beveled, or said faces are relatively inclined to confine the contact to parts having the same diameter, and therefore the same peripheral speed as the rolling faces, the roller-shoulder contacting only at its outer edge or corner.

In Figs. 1 and 2 the spacing-rollers are retained in position by the same flanges on the bearing members which engage the bearing-rollers. Special spacing means may, however, be provided for the spacing-rollers consisting, for example, of spacing-rings, as shown in Fig. 3. The abutments are not necessarily integral with the bearing members, but may be retained thereon, as shown in Fig. 3. This figure also shows provision for adjustment of the abutments to take up wear, said abutments being on flanges at the inner ends of sleeves 15, fastened within an outer member 16, by set-screws 17, which enable longitudinal adjustment, and a screw 18 for locking the parts. Similarly, the abutments 19 are on sleeves 20, adjustably secured on the inner member by screws 21. By adjusting these sleeves the clearance and wear between the abutments and the shoulders of the bearing-rollers 22 may be taken up. The spacing-rollers 23 are here shown as having a pair of flanges 24 at each end extending in grooves 25 of the bearing-rollers, the retaining-rings 26 running between the flanges of each pair.

The bearing shown in Figs. 4 and 5 embodies all of the features of the invention above described. The outer member 27 holds two sleeves 28, embracing between them an abutment-ring 30, whose abutments 31 engage the shoulders 32 at the ends of a central groove 33 on the bearing-rollers 34. Similarly, inner member 35 is surrounded by two sleeves 36, embracing the abutment-ring 37. Rings 30 37 are fastened by screws 38. Bearing-rollers 34 also have grooves 39 near the ends thereof, the outer ends of said grooves engaging with abutment-rings 40 41 at the ends of the outer and inner bearing members. Rings 40 of the outer member are adjustable by screw 65 and washer 42 to take up wear, and ring 41 is similarly adjustable by screw-ring 43 and washer 44. The bearing-rollers 34 and members 28 36 have grooves 45 adjacent to the shoulders and abutments to collect any worn material and prevent it from grinding the bearing parts. This bearing is shown with several different forms of spacing-rollers, all of which may be employed in one bearing without interference, one of which is a short spacing-roller 47 between shoulders 32 and having enlarged end portions 48, between which runs the retaining-ring 49. Short longitudinally-concave spacing-rollers 50 are provided near the ends of the bearing, extending in the grooves 39 of the bearing-rollers and retained by rings 51. Other forms of spacing members are shown in Fig. 5—namely, balls 52 in the central groove 33, a long bearing-roller 53 with double flanges 54 beyond the ends of the bearing-rollers to receive retaining-rings 55, a spacing-roller 56 with end flanges 57 to run in grooves 39 of the bearing-rollers and with a middle enlargement 58 to run in the middle groove 33 or without such middle flange, as shown at 59, or only the middle enlargement 60 may be used, as in roller 61, the reduced end parts moving between the bearing-rollers and having necks 62 to receive the retaining-rings 51. The enlargements on the bearing-rollers or spacing-rollers may be removable, being fastened by screws 64, (see Figs. 4 and 5,) or may be fastened by a screw-thread on the roller, as indicated at 66 in Fig. 5.

It will be noted that in the forms shown in Figs. 3 and 4 each roller engages with the bearing member at a plurality of points at each side of the mid-length of the roller and at different distances from the middle of the roller to produce a plurality of rectifying effects.

In Fig. 5 I show modifications of rollers which may be employed in a single bearing.

What I claim is—

1. A roller-bearing comprising inner and outer bearing members, the inner bearing member provided with a plurality of annular flanges, and bearing-rollers, having a groove near each end, of less diameter than the bearing-surface of said rollers, the inwardly-facing walls of said grooves engaging with the outer faces of said flanges, and the inner faces of said flanges being free from engagement with the rollers.

2. A roller-bearing comprising inner and outer bearing members, the inner bearing member provided with a plurality of annular flanges, and bearing-rollers, having a groove near each end, of less diameter than the rolling diameter, the inwardly-facing walls of said grooves engaging with the outer faces of said flanges, the inner faces of said flanges being free from engagement with the rollers, and spacing means for the rollers.

3. A roller-bearing comprising inner and outer bearing members, the inner bearing member provided with a plurality of annular abutment members, and bearing-rollers, having a groove near each end, of less diameter than the rolling diameter, the inwardly-facing walls of said grooves engaging with the outer faces of said annular abutment members, and the inner faces of said annular abutment members being free from engagement with the rollers, whereby any skewing of the rollers in the bearing causes contact between the rollers and a bearing member tending to rectify the rollers and the rollers being free to move longitudinally in the bearing member to allow such rectifying contacts.

4. A roller-bearing comprising inner and outer bearing members, the inner bearing member provided with a plurality of annular flanges, and bearing-rollers, grooved to engage said flanges on the faces of the grooves farthest from the middle of the rollers, the other faces of the grooves being free from engagement with the flanges, and the grooves being of less diameter than the rolling diameter of the rollers.

5. A roller-bearing comprising inner and outer bearing members, the inner bearing member having a plurality of annular flanges, and bearing-rollers, grooved to engage said flanges on the faces of the grooves farthest from the middle of the rollers, the other faces of the grooves being free from engagement with the flanges, the grooves being of less diameter than the rolling diameter of the rollers, and spacing means for the rollers.

6. A roller-bearing comprising inner and outer bearing members, each having a plurality of annular flanges and bearing-rollers, grooved to engage said flanges on the faces of the grooves farthest from the middle of the rollers, the other faces of the grooves being free from engagement with the flanges, and the grooves being of less diameter than the rolling diameter of the rollers.

7. A roller-bearing comprising inner and outer bearing members, each bearing member being provided with a plurality of annular abutment members, and bearing-rollers, having a groove near each end, of less diameter than the rolling diameter, the inwardly-facing walls of said grooves engaging with the outer faces of said annular abutment members, and the inner faces of said annular abutment members being free from engagement with the rollers, whereby any skewing of the rollers in the bearing causes contact between the rollers and a bearing member tending to rectify the rollers and the rollers being free to move longitudinally in the bearing member to allow such rectifying contacts.

In testimony whereof I have hereunto set my hand, at Los Angeles, California, this 30th day of August, 1906.

OSWALD F. ZAHN.

In presence of—
ARTHUR P. KNIGHT,
FRANK L. A. GRAHAM.